United States Patent Office 3,213,167
Patented Oct. 19, 1965

3,213,167
PROCESS FOR MAKING LIGHTWEIGHT AGGREGATE
Harold T. Stirling, Pittsburgh, Pa., assignor, by mesne assignments, to Stirling Sintering Corporation, a corporation of Pennsylvania
No Drawing. Filed Nov. 6, 1963, Ser. No. 321,695
11 Claims. (Cl. 264—66)

This invention relates to a process for producing lightweight aggregate and, more particularly, to a process for producing uniformly light colored non-staining lightweight aggregate from fly ash.

Fly ash is a by-product derived from the combustion of coal in boiler plants and the like. Pulverized coal is fed to boiler plants where this coal is burned thereby producing two types of ash; a light, finely divided "fly" ash which is carried out in suspension in the gaseous products of combustion, and a heavier "bottom" ash which falls to the bottom of the furnace and is removed therefrom. Fly ash contains five percent or more of unburned carbon and is extremely fine and lightweight. These properties cause a difficult disposal problem since the fly ash readily becomes wind born if stockpiled in the open. This ordinarily waste material has heretofore been formed into a useful product by pelletizing a moist mixture of the fly ash with a suitable binder and then rapidly and intensely heating the pellets while the latter are still damp to thereby form lightweight granules. The granules formed by sintering fly ash can be used as an aggregate in making concrete cinder blocks and numerous other construction materials which are lighter than other such materials.

Sintered fly ash has not, however, proven entirely successful in the construction field because of a staining problem caused by the iron content of fly ash. Ordinary fly ash will contain iron in amounts greater than six percent, and this iron content of the fly ash causes staining on building materials formed from fly ash aggregate. This drawback to the use of fly ash for lightweight building construction is well-known and therefore the American Society for Testing Materials has devised a test for determining a Stain Index to ascertain whether fly ash aggregate shall be accepted or rejected for use in concrete masonry units. This test can be found in the American Society for Testing Materials Specification for Lightweight Aggregates for Concrete Masonry Units ASTM designation C331–53T, paragraphs 4(b) and 7(i).

It is an object of the present invention to provide a process for utilizing fly ash to form a lightweight aggregate, which process avoids the staining problems heretofore known in a simple, economical and facile manner.

Previous attempts to reduce the staining of the lightweight aggregate formed fly ash have been centered around the removal of the iron content of the fly ash before agglomeration and sintering thereof. The removal of iron, the major cause of staining, eliminates most of the staining problem. The cost of removing the iron from the fly ash, however, is extremely high and the expense has rendered such removal implausible.

In accordance with the present invention, a non-staining lightweight aggregate is formed from fly ash by pelletizing a moist mixture of fly ash and water and then preheating the pellets for a period of time between five and fifteen minutes to temperatures between 1200° and 1800° F. The preheated pellets are then rapidly raised to a sintering temperature between 1900° and 2800° F.

The following examples illustrate the process of this invention:

*Example I*

A sample of fly ash was pelletized in the pelletizing and sizing drum described in my copending application Serial No. 274,251, filed April 19, 1963, in the presence of water as binder to form fly ash pellets having a size between 0.25 and 0.5 inch. A portion of these pellets were then preliminarily heated at a temperature of 600° for 6 minutes. The pellets were then passed to a preheating zone where they were fired at a temperature of 1625° F. for 10 minutes. These preheated pellets were then passed to an ignition zone where they were fired at 2250° for 3 minutes. A draft was then induced through the bed of ignited pellets and this draft was continued for 5 minutes. At the high temperatures to which the bed of pellets were subjected the carbon was burned out, trapped moisture and gases were driven off, and there was at least insipient fusion of the fly ash. The intense heating thereby transformed the pellets into structurally stable sintered lightweight granules having a multiplicity of interior voids due to the burning out of the carbon and the expulsion of the gases formed by heating of the water binder. The sintered product could be separated into individual pellets which were uniformly colored light brown or tan throughout the thickness thereof.

The sinntered product was subjected to the stain test described in the aforementioned ASTM specification C331–53T. The product had a stain index of 20.

*Example II*

As a comparison another portion of the fly ash pellets formed in Example I were passed without preheating to an ignition zone where they were fired at 2250° for 1 minute. During this period the intense heating caused a large number of individual pellets to explode and the process had to be stopped. The explosion of the pellets was apparently caused by the sudden vaporization of the water present in the pellets.

In an attempt to avoid this explosion problem the temperature was lowered in the following example.

*Example III*

An additional portion of fly ash pellets formed in Example I were passed without preheating to an ignition zone where they were fired at 2100° F. for 3 minutes. At this temperature only a few of the pellets exploded and the remainder were transformed into structurally stable sintered lightweight granules.

The sintered product was separated into individual pellets which pellets were tan colored on the outside and black in the middle.

The sintered product was subjected to the stain test described in ASTM specification C331–53T. The product had a stain index of 100.

While the preceding examples have illustrated specific embodiments of this invention it will be obvious to those skilled in the art that many variations are possible without departing from the scope of this invention; for example the preceding Example I describes the preheating step as being carried out at 1625° F. While this temperature is preferred, the preheating step may be carried out between 1200° and 1800° F. while in general it is desirable to maintain a temperature during the preheating step of 1500–1700° F. The time during which the preheating takes place is preferably about 10 minutes. However, any period of time between 5 and 15 minutes is operable and 8–12 minutes is desirable.

The sintering temperature during which ignition of the pellets takes place will vary between 1900 and 2800° F. and it is desirable to maintain this temperature between 2100 and 2350° F. while 2200° F. is preferred. The ignition step may last for between 2 and 6 minutes, and the forced draft can be continued for from 4 to 8 minutes.

In the manner clearly shown by the preceding examples, the process of the prior art as shown in Example III results in the formation of sintered pellets having dark centers caused by the presence of the reduced form of the iron in the pellets. The pellets having dark centers result in heavy staining when subjected to the ASTM stain test described above. It is evident from Example I which describes the process of this invention that the product pellets of this invention have a uniformly light color because the iron in the pellets is in an oxidized state. The product pellets of Example I when subjected to the stain test have a stain index of 20 which is considered a very light stain. This compared to a stain index of 100 shown in Example III. A stain index of less than 60 is generally considered to be satisfactory.

Dark centers in the pellets produced in the prior art as exemplified by Example III apparently are produced because the high temperature to which the pellets were immediately subjected forms a dense shell around each pellet. The dense shell restricts the passage of gases into and out of the pellet and, therefore, when the temperature in the interior of the pellet is raised to a point where combustion of the carbon occurs the iron in the inside of the pellet is necessarily reduced in order to supply the oxygen for the combustion of the carbon. It is the reduced form of the iron that causes staining and the black coloration of the final product. By preheating in the given temperature range and for the given period of time no such dense shell is formed, and therefore air can pass into and out of the pellets thereby supplying oxygen and allowing the highly oxidized iron to remain in that state.

It is obvious from the foregoing description that the process of this invention is a simple step forward in the art of sintering fly ash into lightweight aggregate. No expensive or elaborate equipment is required. Merely by the simple step of preheating the pellets prior to sintering them, the entire problem of staining can be eliminated.

I claim:

1. In a process for producing lightweight aggregate from fly ash wherein said fly ash is pelletized to form pellets and the pellets are sintered, the improvement for forming a non-staining uniformly light colored product comprising preheating said pellets at a temperature between 1200 and 1800° F. for about five to fifteen minutes.

2. The process of claim 1 wherein said pellets are preheated at a temperature between 1500° and 1700° F., and wherein said pellets are sintered by ignition at a temperature between 1900° and 2800° F.

3. The process of claim 2 wherein aid pellets are preheated for about 10 minutes.

4. In a process for producing lightweight aggregate from fly ash wherein said fly ash is pelletized to form pellets, and then sintered, the improvement for forming a non-staining uniformly light colored product comprising preheating said pellets for 5 to 15 minutes at a temperature between 1200 and 1800° F.

5. The process of claim 4 wherein said pellets are preheated for 8 to 12 minutes.

6. In a process for producing lightweight aggregate from fly ash wherein said fly ash is pelletized to form pellets and subsequently sintered, the improvement for forming a non-staining uniformly light colored product comprising preheating said pellets for a period of 5 to 15 minutes at a temperature between 1500 and 1700° F.

7. In a process for producing lightweight aggregate from fly ash wherein said fly ash is pelletized to form pellets, and subsequently sintered at temperatures of 1900–2800° F., the improvement for forming a non-staining uniformly light colored product comprising preheating said pellets for 5 to 15 minutes at a temperature of about 1625° F.

8. A process for the production of non-staining lightweight aggregate from fly ash comprising pelletizing said fly ash to produce pellets, preheating said pellets at a temperature between 1200 and 1800° F. for between 5 and 15 minutes and finally sintering said pellets at a temperature between 1900 and 2800° F., whereby a structurally stable produce having a uniform light brown coloration throughout and a stain index of less than 60 is obtained.

9. The process of claim 8 wherein said pellets are preheated for 8 to 12 minutes at a temperature between 1500° and 1700° F.

10. A process for the production of non-staining lightweight aggregate from fly ash comprising pelletizing said fly ash to produce pellets, forming a bed of said pellets, heating said bed of pellets to a temperature between 300–1000° F. for a period of 4 to 8 minutes, then preheating said bed of pellets at a temperature between 1200 and 1800° F. for between 5 and 15 minutes, then igniting said bed of pellets by subjecting them to a flame at a temperature between 1900 and 2800° F. for a period of 2 to 6 minutes, and then forcing air through said bed of pellets for from 4 to 8 minutes, whereby the pellets are sintered to transform the pellets into structurally stable granules having a uniform light brown coloration throughout and a stain index of less than 60.

11. The process of claim 10 wherein said bed of pellets is preheated for about 10 minutes at a temperature of about 1625° F.

References Cited by the Examiner

UNITED STATES PATENTS 2,544,752  3/51  Gelbman _____ 264—63
2,693,017  11/54  Czarnecki.

ROBERT F. WHITE, *Primary Examiner.*

ALEXANDER H. BRODMERKEL, *Examiner.*